Nov. 2, 1943.  O. J. POUPITCH  2,333,388
FASTENER DEVICE
Filed March 13, 1942   2 Sheets-Sheet 1
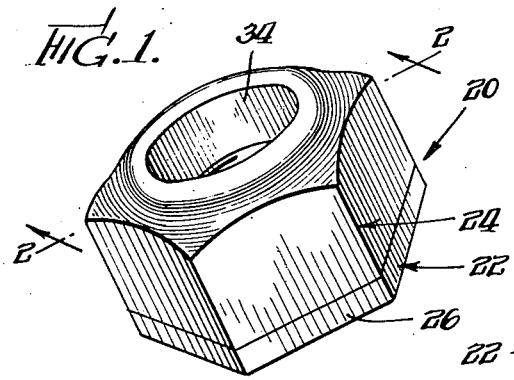
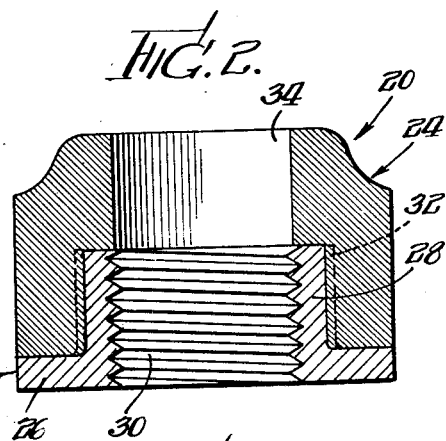
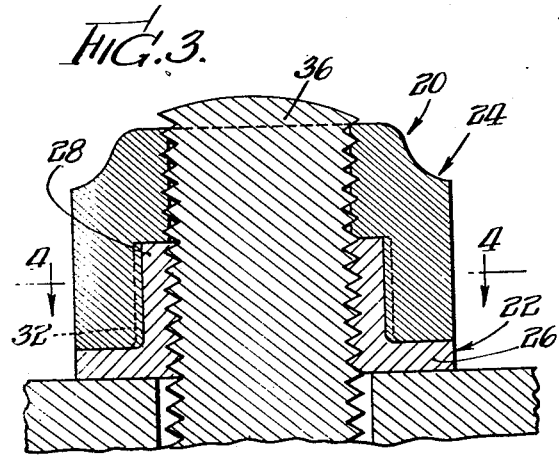
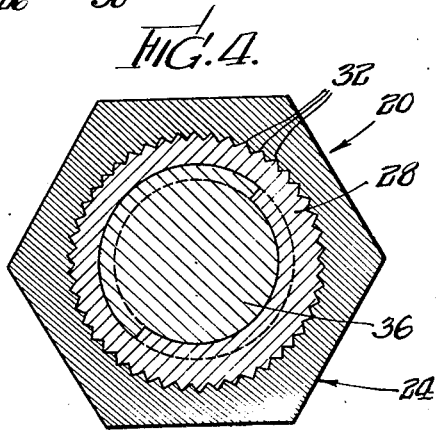
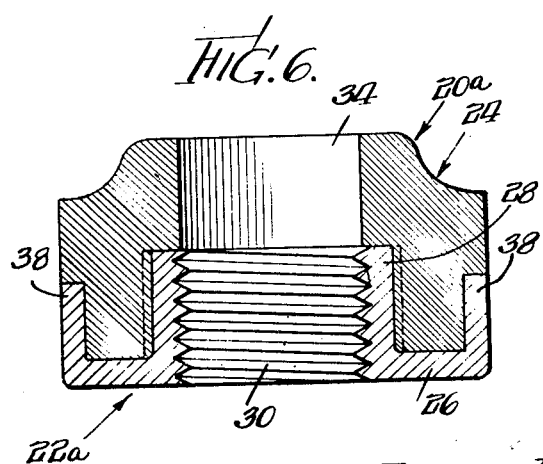
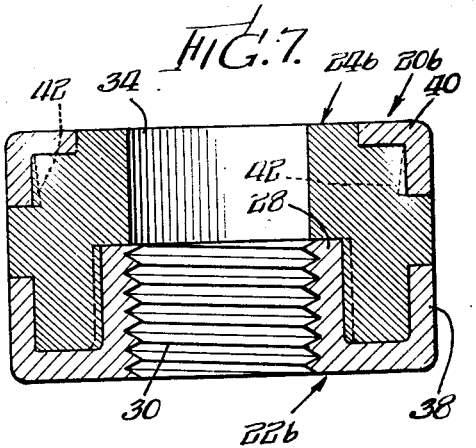
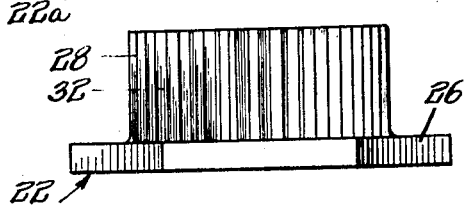
INVENTOR.
Ougljesa Jules Poupitch
BY Cox Moore & Olson
attys.

Nov. 2, 1943.     O. J. POUPITCH     2,333,388
FASTENER DEVICE
Filed March 13, 1942     2 Sheets-Sheet 2
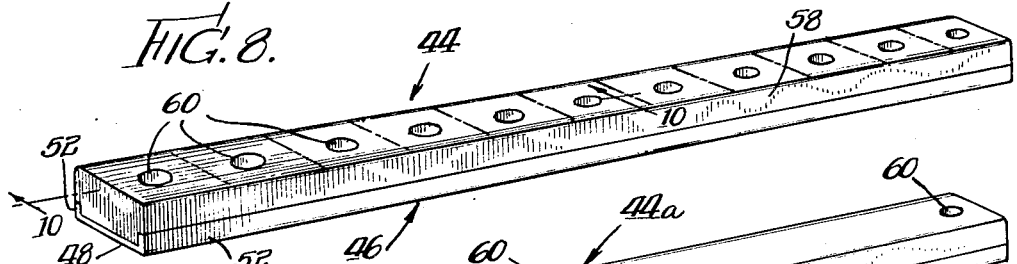
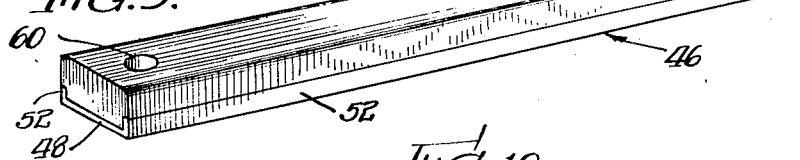
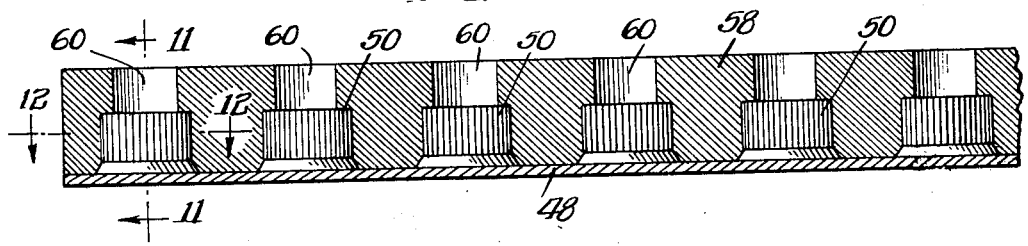
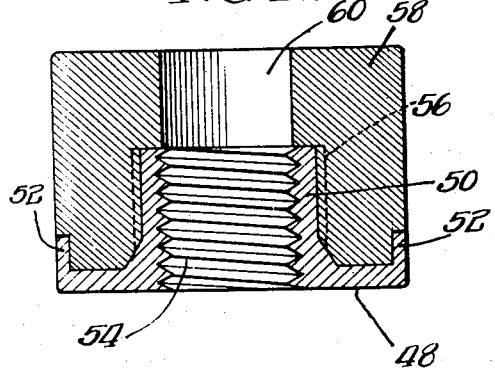
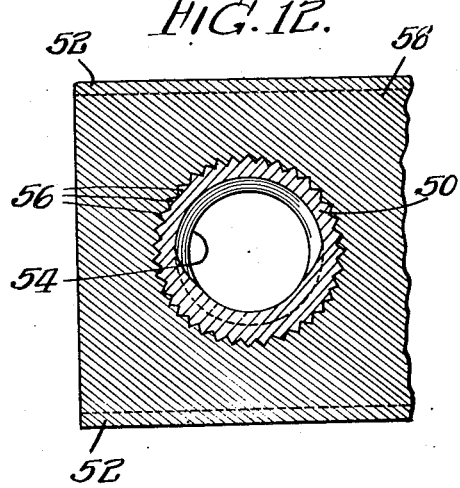
INVENTOR.
Ougljesa Jules Poupitch
BY: Cox Moore & Olson
attys.

Patented Nov. 2, 1943

2,333,388

UNITED STATES PATENT OFFICE 2,333,388

FASTENER DEVICE

Ougljesa Jules Poupitch, Chicago, Ill., assignor to Illinois Tool Works, Chicago, Ill., a corporation of Illinois Application March 13, 1942, Serial No. 434,453

12 Claims. (Cl. 151—7)

This invention relates generally to fastening devices and more particularly to fastening devices such as nuts and the like adapted to lockingly impinge the thread convolutions of a screw member.

Plastic materials of various kinds have heretofore been employed in association with fastening devices such as nuts to effect locking impingement of the thread convolutions in a screw member. However, the present invention contemplates the use of plastic or other similar non-metallic material as a locking element in a new and improved structural environment. For example, it is one of the important objects of the present invention to produce a self-locking fastening device of the general type referred to above which is unusually light in weight and yet exceptionally powerful in locking properties.

It is a further and very important object of the present invention to provide a fastening device in which impressionable non-metallic material, such, for example, as plastic material, forms the locking element thereof and in which a minimum amount of associated supporting metallic structure need be employed, thereby presenting a device capable of being produced with the utmost economy without sacrificing any of the required degree of strength and locking efficiency.

It is a further object of the present invention to provide a fastening device of the type set forth above wherein the metallic portion thereof, such, for example, as a metallic threaded ferrule insert, may be stamped from sheet metal stock, as distinguished from the more expensive screw machine operations which have in some instances heretofore been employed.

Still more specifically, the present invention contemplates a fastening device of the above mentioned type wherein a centrally apertured plastic or impressionable non-metallic section is molded around a central threaded insert, said insert providing a rigid support for the non-metallic section and enabling an internal thread to be impressed within the non-metallic section by a screw member associated with the threaded insert.

A further object of the present invention is to provide a fastening device composed partly of metal and partly of non-metallic impressionable material in which the impressionable material forms a covering for the metallic part and in this capacity functions not only as an effective self-locking medium but also as a cap having an external surface which is pleasingly attractive to the eye. To this end the invention contemplates the use of plastic materials varying in texture and color to meet the particular needs incident to the use of the fastening device of which it forms a part.

The foregoing and other objects and advantages will be apparent from the following detailed description when considered in connection with the accompanying drawings, wherein—

Figure 1 is a perspective view of a self-locking nut constructed in accordance with the teachings of the present invention;

Figure 2 is a vertical sectional view of the aforesaid nut taken substantially along the line 2—2 of Figure 1;

Figure 3 is a view similar to Figure 2 disclosing the nut in operative association with a screw member and clamped against the surface of a work piece;

Figure 4 is a transverse sectional view taken substantially along the line 4—4 of Figure 3;

Figure 5 is a side elevational view of the insert shown in Figures 1 to 4, inclusive, disassociated from the locking cap;

Figure 6 is a central sectional view similar to Figure 2 disclosing a locking nut having a slightly modified insert member;

Figure 7 discloses a still further modified arrangement wherein the plastic or non-metallic locking section of the nut is encircled by ferrule members at both extremities;

Figure 8 is a perspective view disclosing the invention in strip form, from which individual self-locking nuts may be produced.

Figure 9 is a view similar to Figure 8 disclosing the invention as applied in instances where strip material is to serve as a fastener unit;

Figure 10 is a fragmentary vertical sectional view taken substantially along the line 10—10 of Figure 8;

Figure 11 is an enlarged transverse sectional view taken substantially along the line 11—11 of Figure 10; and Figure 12 is a fragmentary plan sectional view of the left extremity of the strip taken along the line 12—12 of Figure 10.

Referring now to the drawings more in detail wherein like numerals have been employed to designate similar parts throughout the various figures, it will be seen that one embodiment of the present invention comprises the fastener unit or device illustrated in Figures 1 to 5, inclusive, the assembled fastener device or unit being designated generally by the numeral 20. The device 20 is comprised of two parts, a metallic base section designated generally by the numeral 22 and a non-metallic impressionable section or cap designated by the numeral 24. The base section 22 includes a plate portion 26 and a sleeve portion 28 extending laterally thereof. The sleeve portion 28 is provided with a conventional internal thread 30 and has an external surface which is preferably roughened as by means of serrations or knurlings 32.

The non-metallic locking cap 24 overlies the plate portion 26 and encircles the internally threaded sleeve portion 28, as clearly illustrated in the drawings. It has been found advantageous to actually mold the cap 24 upon the base section 22. When the cap is thus molded around the sleeve portion 28, a firm interlock or bond is established by reason of the flowing of the material of the cap between the serrations or knurlings 32. These knurlings may either be of the axially extending type shown in the drawings or of the well-known criss-cross type. In any event the interlock between the cap 24 and the knurled or roughened sleeve surface serves to unite the cap and base section as a rotatable unit.

The cap 24 is provided with a central aperture 34 having a diameter which is sufficiently less than the maximum diameter of the thread 30 within the base section to insure locking impingement of the impressionable material of the cap with thread convolutions of an associated screw member 36. When the fastener device or nut 20 is initially applied to the screw member 36, the thread convolutions in the sleeve portion 28 spin freely upon the complementary thread of the screw 36. As the screw 36 becomes associated with the aperture 34, the thread convolutions of the screw indent a complementary thread within the impressionable material of the cap. The material of the cap must not only be impressionable but must also possess the required degree of elasticity or resiliency to exert locking pressure against the thread convolutions of the screw. This pressure or frictional resistance is sufficient to prevent unauthorized or inadvertent retrograde rotation of the nut with respect to the screw.

It will be apparent from the description thus far given that the impressionable or plastic material not only functions as an effective locking medium but also as a cap having an external appearance which is pleasingly attractive to the eye. That is to say, the invention contemplates the use of plastic materials having colors and textures particularly suited to the purpose for which the lock nuts are to be used. Thus, for example, in instances where the self-locking nuts are to be used in association with surfaces having a particular color scheme, a corresponding or blending color may be incorporated in the plastic material of the cap.

In Figure 6 a slightly modified nut structure 20a is disclosed having a base section which is designated generally by the numeral 22a. This section 22a, like the section 22, incorporates the plate portion 26 and an axially extending and internally threaded sleeve portion 28. Extending from the outer margin of the plate portion 26 is a flange section 38 which serves to lend peripheral support to the cap 24. The flange section 38 also provides a metallic outer surface adapted to be gripped by a turning tool such as a wrench and cooperates with the previously described knurlings or serrations 32 in preventing relative rotation between the base section and the cap.

Figure 7 discloses a further modified self-locking nut designated generally by the numeral 20b. This nut 20b incorporates a base section 22b, an impressionable or plastic cap 24b and a metallic strengthening annulus or ferrule 40. The base section 22b is structurally similar to the base section 22a of Figure 6 and therefore similar numerals are employed to designate corresponding features thereof. The only material difference between the structure of the self-locking nut 20b and the nut 20a of Figure 6 is the addition of the strengthening ferrule 40. This metallic ferrule 40 may be used in instances where the indenting of the thread within the cap may have a tendency to cause fracture. In such instances the encircling of the cap by the ferrule 40 lends considerable strength to the cap structure. Also the periphery of both the ferrule 40 and the flange 38 provides surfaces for receiving a turning tool such as a wrench. In instances where it may be deemed desirable in order to more firmly secure the ferrule against axial dislodgment, inwardly extending projections or serrations 42 may be employed. These or other suitable means may be used to provide a more firm interlock between the metallic band or ferrule 40 and the impressionable plastic material of the cap 24b.

In Figure 8 I have disclosed a strip or bar designated generally by the numeral 44 from which sections may be severed to provide self-locking nuts. This bar or strip 44 includes a metallic base section 46, which in cross-section, as illustrated in Figure 11, includes a plate portion proper 48, a lateral or axially extending sleeve portion 50, and marginal flanges 52. The sleeve portion 50 is provided with an internal thread 54 and the external surface of the sleeve portion is provided with suitable serrations or knurlings 56. The sleeve portions 50, like the sleeve portions 28 previously described, may be conveniently extruded from the material of the base plate. After the metal has been thus extruded to provide the sleeve it may be internally threaded by means of a tap and its external surface suitably knurled. The base section 46 supports a non-metallic impressionable bar or strip 58 which may be associated with the base section by a molding process. Apertures 60 are provided which are co-extensive with the threaded aperture of a companion sleeve portion 50. The diameter of the aperture 60, like the diameter of the apertures 34 previously described, is slightly less than the maximum diameter of the thread convolutions of the associated sleeve portions 50. When the bar or strip 44 is severed along the dot and dash lines, a plurality of individual lock nuts is provided. These lock nuts function in the same manner as the lock nuts 20, 20a and 20b previously described.

In instances where a locking strip as distinguished from a locking nut is required, a fastening strip or bar designated generally by the numeral 44a of Figure 9 may be employed. This bar is similar to the bar 44 in structural cross-section but is limited to a lesser number of extruded sleeve portions 50. Thus, the strip or bar 44a is in itself a fastening device and is not severed into a plurality of independent nuts as described in connection with the structure shown in Figures 8, 10, 11 and 12. A section taken transversely of the bar 44a at any one of the apertures 60 would present the same structural details as those shown in Figures 11 and 12.

From the foregoing it will be apparent that the present invention contemplates a fastener device of improved construction which may be produced by the practice of conventional machine shop and molding methods. By having a substantial portion of the locking device or nut composed of plastic materials which are relatively light in weight the resulting structure is also of relatively light weight when compared with commercially available locking nuts in which metal forms a substantial portion of the structure. Although the locking devices contemplated by the present invention are of relatively light weight, their locking effectiveness is equally as great, if not superior, to other lock nuts which are of heavier metallic design. As previously pointed out, the cap construction is such as to enable the effective use of plastic materials not only for locking purposes but also for the purpose of attractive ornamentation. The color and texture of the plastic material may be chosen to harmonize with the color and texture of the structure with which the fastening device is to be used.

Obviously the invention is not limited to the structural features of design set forth herein but is capable of other changes and modifications without departing from the spirit and scope of the appended claims.

The invention is hereby claimed as follows:

1. A fastening device comprising a metallic base section providing a work clamping surface, said section including a base plate portion and an internally threaded sleeve portion extending laterally thereof, and an impressionable non-metallic locking cap overlying said base plate and encircling said sleeve portion, said cap and base section being interlocked as a unit, the cap having an aperture positioned in axial alignment with said internally threaded sleeve portion, the diameter of said aperture being sufficiently less than the maximum diameter of the thread in the sleeve portion to insure locking impingement of the impressionable material of the cap with an associated screw member complementary to and relatively rotatable within said sleeve portion.

2. A fastening device as set forth in claim 1 wherein the means for interlocking the cap and base section includes an element projecting from said sleeve portion into said cap.

3. A fastening device as set forth in claim 1 wherein the means for interlocking said cap and base includes an element projecting from the base plate into locking association with said cap.

4. A fastening device as set forth in claim 1 wherein the periphery of the sleeve portion is provided with a plurality of protuberances interlocking with the material of the cap.

5. A fastening device as set forth in claim 1 wherein flange means extending laterally of the base plate interlock with the cap.

6. A self-locking nut structure comprising a metallic base section providing a work clamping surface, said section including an internally threaded sleeve portion, and an impressionable non-metallic locking cap extending beyond and encircling said sleeve portion, said cap and base section being interlocked as a rotatable unit, the cap having an aperture positioned in axial alignment with said internally threaded sleeve portion, the diameter of said aperture being sufficiently less than the maximum diameter of the thread in the sleeve portion to insure locking impingement of the impressionable material of the cap with an associated screw member complementary to and relatively rotatable within said sleeve portion.

7. A fastening device comprising a metallic base section providing a work clamping surface, said base section including an internally threaded sleeve portion, and an impressionable non-metallic locking cap extending beyond and encircling said sleeve portion, said cap and base section being interlocked as a unit, the cap having an aperture positioned in axial alignment with said internally threaded sleeve portion, the diameter of said aperture being sufficiently less than the maximum diameter of the thread in the sleeve portion to insure locking impingement of the impressionable material of the cap with an associated screw member complementary to and relatively rotatable within said sleeve portion, the top and side portions of said non-metallic cap being exposed.

8. A fastening device comprising a metallic base section providing a work clamping surface, said base section including an internally threaded sleeve portion, an impressionable non-metallic locking cap extending beyond and encircling said sleeve portion, said cap and base section being interlocked as a unit, the cap having an aperture positioned in axial alignment with said internally threaded sleeve portion, the diameter of said aperture being sufficiently less than the maximum diameter of the thread in the sleeve portion to insure locking impingement of the impressionable material of the cap with an associated screw member complementary to and relatively rotatable within said sleeve portion, portions of the top and side of said non-metallic cap being exposed, and metallic strengthening means engaging remaining portions of the periphery of said cap.

9. A self-locking nut structure comprising a metallic base section providing a work clamping surface, said section including an internally threaded sleeve portion, and an impressionable non-metallic locking cap extending beyond and encircling said sleeve portion, said cap and base section being interlocked as a rotatable unit, the cap having an aperture positioned in axial alignment with said internally threaded sleeve portion, the diameter of said aperture being sufficiently less than the maximum diameter of the thread in the sleeve portion to insure locking impingement of the impressionable material of the cap with an associated screw member complementary to and relatively rotatable within said sleeve portion, the periphery of said cap portion providing surfaces adapted to be engaged by a turning tool such as a wrench.

10. A self-locking nut structure comprising a metallic base section providing a work clamping surface, said section including an internally threaded sleeve portion, an impressionable non-metallic locking cap extending beyond and encircling said sleeve portion, said cap and base section being interlocked as a rotatable unit, the cap having an aperture positioned in axial alignment with said internally threaded sleeve portion, the diameter of said aperture being sufficiently less than the maximum diameter of the thread in the sleeve portion to insure locking impingement of the impressionable material of the cap with an associated screw member complementary to and relatively rotatable within said sleeve portion, and metallic wall portions associated with the periphery of said cap and adapted to be gripped for turning by a tool such as a wrench.

11. A fastening device compising an elongated metallic base section, said section including a base plate portion and a plurality of internally threaded sleeve portions spaced along and extending laterally of said base plate portion, and an impressionable non-metallic locking strip overlying said base plate and encircling each of said sleeve portions in close fitting relation, the non-metallic strip having apertures complementary to and positioned in axial alignment with each of said internally threaded sleeve portions, the diameter of said aperture being sufficiently less than the maximum diameter of the thread in the sleeve portion to insure locking impingement of the impressionable material with an associated screw member complementary to and relatively rotatable within each of said sleeve portions.

12. A fastening device comprising an elongated metallic base section, said section including a base plate portion and a plurality of internally thread sleeve portions spaced along and extending laterally of said base plate portion, an impressionable non-metallic locking strip overlying said base plate and encircling each of said sleeve portions in close fitting relation, the non-metallic strip having apertures complementary to and positioned in axial alignment with each of said internally threaded sleeve portions, the diameter of said apertures being sufficiently less than the maximum diameter of the thread in the sleeve portion to insure locking impingement of the impressionable material with an associated screw member complementary to and relatively rotatable within each of said sleeve portions, and flange means extending along opposite margins of said base section engaging the adjacent side walls of said non-metallic strip.

OUGLJESA JULES POUPITCH.